United States Patent
LaLone

(10) Patent No.: US 6,206,483 B1
(45) Date of Patent: Mar. 27, 2001

(54) EMPTY-LOAD DEVICE WITH BRAKE CYLINDER TEST PORT

(75) Inventor: Luann M. LaLone, Adams, NY (US)

(73) Assignee: New York Air Brake Corporation, Watertown, NY (US)

( * ) Notice: Subject to any disclaimer, the term of this patent is extended or adjusted under 35 U.S.C. 154(b) by 0 days.

(21) Appl. No.: 09/244,978

(22) Filed: Feb. 4, 1999

Related U.S. Application Data

(63) Continuation-in-part of application No. 09/069,201, filed on Apr. 29, 1998.

(51) Int. Cl.⁷ ................................................. B60T 8/18
(52) U.S. Cl. ...................... 303/22.2; 303/22.6; 188/195
(58) Field of Search ........................ 303/22.1, 22.2, 303/22.3, 22.4, 22.5, 22.6, 22.7, 22.8, 28, 37, 33; 188/195

(56) References Cited

U.S. PATENT DOCUMENTS

| | | | |
|---|---|---|---|
| 2,318,965 | * | 5/1943 | Parker et al. ................. 251/149.1 |
| 3,589,673 | * | 6/1971 | Cruse ........................... 251/149.1 |
| 4,583,790 | | 4/1986 | Scott . |
| 5,005,915 | | 4/1991 | Hart et al. . |
| 5,211,450 | * | 5/1993 | Gayfer et al. .................. 303/22.2 |
| 5,303,987 | | 4/1994 | McKay . |
| 5,451,099 | * | 9/1995 | Hart et al. ....................... 303/37 |
| 5,738,417 | | 4/1998 | Wood et al. . |
| 5,869,754 | * | 2/1999 | Scott et al. ..................... 73/121 |
| 5,869,765 | | 2/1999 | Scott et al. . |

OTHER PUBLICATIONS

*Brake Cylinder Monitoring Equipment*, Featuring the Quick Disconnect Tap with Double O–Ring Protection from WABCO.

* cited by examiner

*Primary Examiner*—Robert J. Oberleitner
*Assistant Examiner*—Devon Kramer
(74) *Attorney, Agent, or Firm*—Barnes & Thornburg

(57) ABSTRACT

An empty-load device with an additional brake cylinder test port which is at the same pressure as the brake cylinder port of the empty-load device. The empty-load device includes a housing and pipe bracket having a brake cylinder, a control valve and brake cylinder test ports. The brake cylinder port and the brake cylinder test port are on one side of the valve seat of the load responsive valve and the control valve port is on an opposite side of the valve seat. A check valve is provided in the brake cylinder test port which is opened when a connector is mated with a brake cylinder test port.

14 Claims, 3 Drawing Sheets

EMPTY-LOAD DEVICE WITH BRAKE CYLINDER TEST PORT

CROSS-REFERENCE

This is a continuation-in-part of U.S. Ser. No. 09/069,201 filed Apr. 29, 1998.

BACKGROUND AND SUMMARY OF THE INVENTION

The present invention relates to empty-load device and more specifically, to an empty-load device with a brake cylinder test port and the brake system in which is incorporated.

An empty-load changeover apparatus is a device which senses the load of the car to which it is connected and modifies the braking signal received from a control valve to the brake cylinder. One example is shown in U.S. Pat. No. 4,884,544 to Rojecki as well as an improved version in U.S. Pat. No. 5,211,450 to Gayfer et al. These typical devices have an inlet to receive the brake signal from the control valve and an outlet to be connected to the brake cylinder. An additional port is provided for an equalization reservoir.

There are many situations where it is desirable to measure the brake cylinder pressure. This generally requires special taps put in the line prior to the brake cylinder. If it is placed at the exit of the braking signal from the control valve, it would not take into account those systems which have an empty-load device. If it is between the empty-load device and the control valve, it would not provide an accurate measurement of the brake cylinder pressure. More recently, test ports have been added to the manifold of the control valve. Again, this would be upstream of the empty-load device and not provide an accurate indication of the brake cylinder pressure downstream from the empty-load device.

The present invention provides an empty-load device with an additional brake cylinder test port which is at the same pressure as the brake cylinder port of the empty-load device. The empty-load device includes a housing having a brake cylinder, a control valve and brake cylinder test ports. A valve structure in the housing limits fluid pressure at the brake cylinder port and brake cylinder test port from the control valve port in response to a load force on the rail car. The valve structure includes a valving element and a valve seat. The brake cylinder port and the brake cylinder test port are on one side of the valve seat and the control valve port is on an opposite side of the valve seat. A check valve is provided in the brake cylinder test port which is opened when a connector is mated with a brake cylinder test port. The brake cylinder test port may be provided on the housing itself or on the pipe bracket which includes the brake cylinder port and the control valve port. An equalization reservoir port is also provided on the pipe bracket.

A railroad system which incorporates the empty-load device just described includes a control valve having an outlet providing a brake signal. The outlet of the brake control valve is connected to an inlet, which is the control valve port of the empty-load device. The brake cylinder port is an outlet and the brake cylinder test port is a test port. A valve structure limits the fluid at the device outlet and test port from the device inlet in response to a load force on the rail car. A brake cylinder is connected to the device outlet.

Other objects, advantages and novel features of the present invention will become apparent from the following detailed description of the invention when considered in conjunction with the accompanying drawings.

DETAILED DESCRIPTION OF THE EMBODIMENT

Figure 1:
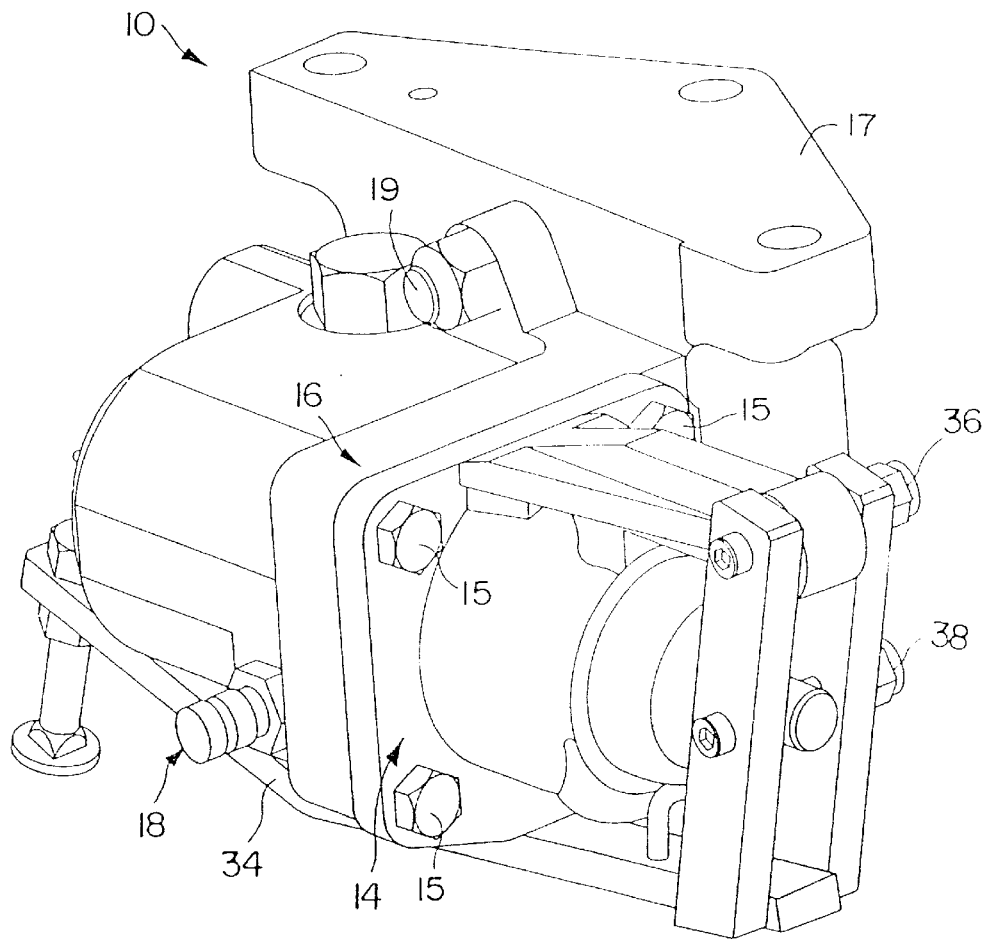
FIG. 1 is a perspective view of an empty-load device incorporating the principles of the present invention in the release position.
Figure 2:
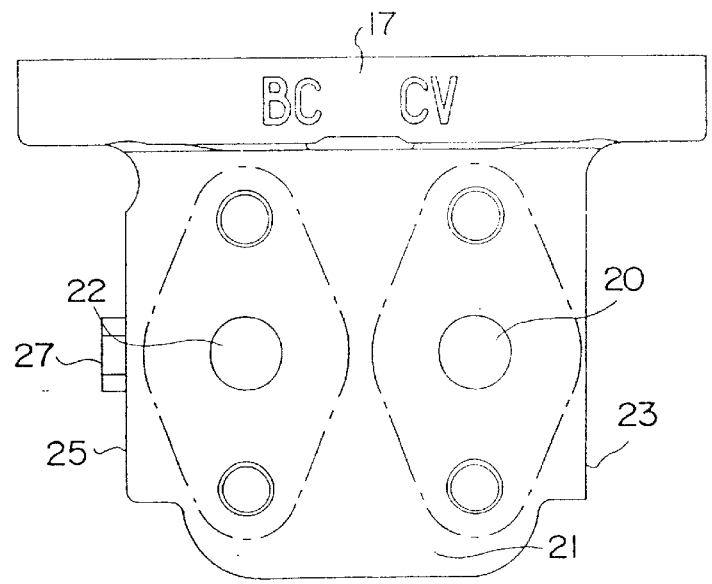
FIG. 2 is a back view of the empty-load device of FIG. 1.

In a rail brake system, emergency and auxiliary reservoirs are charged from a brake pipe through a control valve. In a charged system, no fluid pressure is present in a brake cylinder. The control valve monitors the brake pipe and supplies pressure from the reservoir to or removes pressure from the brake cylinder in response to change of pressure in the brake pipe. Brake pipe systems are well known as described in the patents discussed above.

An empty-load device 10 shown in FIGS. 1–6 includes a housing 12 having first housing portion 14 joined to a second housing portion 16 by fasteners 15. A pipe bracket 17 is connected to the housing portion 16 by fastener 19. The empty-load device 10 includes a brake cylinder test port 18, a control valve port or inlet 20, a brake cylinder port or outlet 22, an equalizing volume port 24, and exhaust port 26.

Figure 3:
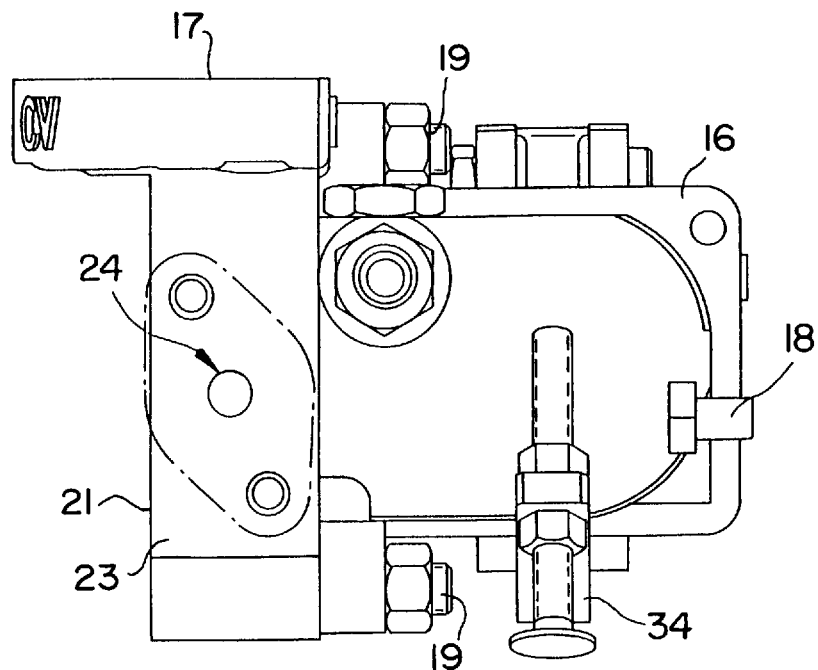
FIG. 3 is a left side view of the empty-load device of FIG. 1.

The brake cylinder test port 18 is illustrated in FIG. 1 as being connected to the housing portion 16 of housing 12. The control valve port 20 and the brake cylinder port 22 are connected to the pipe bracket 17 at face 21 of the pipe bracket. The equalization valve port 24 may either be on the left side face 23 as illustrated in FIG. 3 or on the right side face 25, as illustrated on FIG. 6. The exhaust port 26 is in the body portion 16 of the housing 12. The right side face 25 in FIGS. 2 and 5 includes a plug 27 received in a passage in the face which leads to the interior of the housing portion 16. This provides an alternative brake cylinder test port as illustrated in phantom FIG. 5. The additional test port is indicated as 18'.

Figure 6:
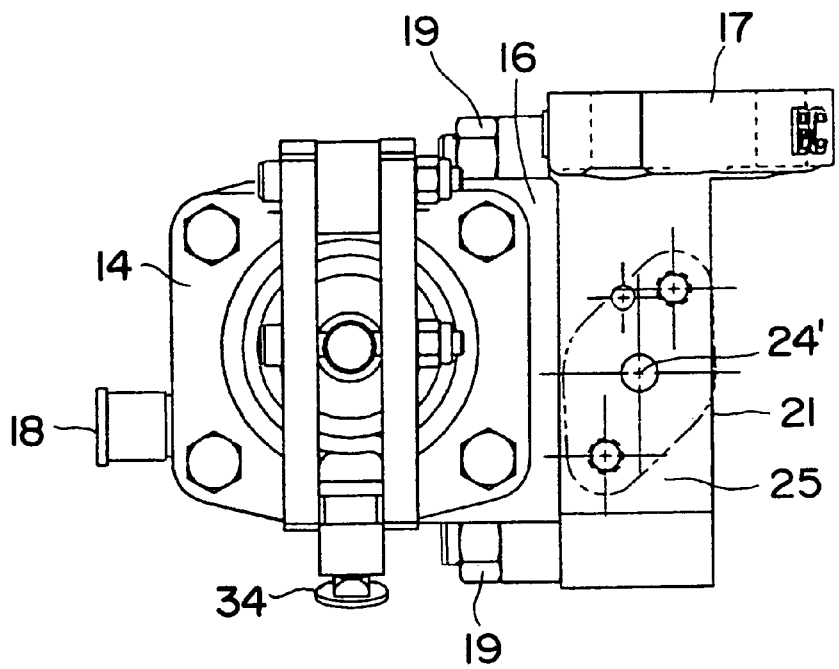
FIG. 6 is a right side view of a second embodiment of the empty-load device of FIG. 1.

For a left handed model where the equalization reservoir is mounted to face 23, the right face 25 could include the additional test port 18'. Plug 27 would be removed and a connector would be inserted. For a right handed model, the equalization reservoir port 24' would be on the right face 25 as illustrated in FIG. 6. The alternative brake cylinder test port 18' would not be provided in that face. The left handed face 23 would not have the equalization reservoir port 24 as shown in FIG. 3. The brake cylinder test ports 18 and 18' preferably have a quick disconnect nipple and a check valve (not shown) which is opened when mated with a connector of a test device.

A control valve 28 is connected to control valve port 20; brake cylinder 30 is connected to brake cylinder port 22; and an equalizing volume 32 is mounted to the housing portion 16 and connected to equalizing volume port 24.

A load-sensing lever 34 is pivotally connected at 36 to the housing portion 14 and is also pivotally connected at 38 to a push rod 40 extending from the housing portion 14. The sensing lever 34 contacts a portion of an unloaded structure of a railroad car track to sense the load force of the car.

A sensing piston 42 includes a pair of members which are connected to the body 12 by a diaphragm. The sensing piston 42 is secured to the push rod 40 between a shoulder 41 on the push rod and a threaded fastener 43. A spring 44 extends between the housing portion 14 and a face of the sensing piston 42 and biases the sensing piston 42 to the right in the figures. It should be noted that the housing portion 14, the sensing lever 34, the push rod 40, the spring 44, and a sensing piston 42 is substantially as that shown in the Scott patent 3,671,086 and is the valve known as SC-1.

The push rod 40 includes an actuator 46 threadably received therein and extending through a ratio piston 48. The ratio piston 48 includes a first surface 50 facing a surface of the sensing piston 42 with the brake cylinder port 22 therebetween. A second surface 52 of the ratio portion 48 is smaller than the first surface 50. A ratio valve, which bypasses the ratio piston when open, is mounted on and travels with the ratio piston 48. The ratio valve includes a valve seat 54 in the smaller surface 52 of the ratio piston 48, a valving member 56, a biasing spring 58, a spring cage 60, and retainer 62. The ratio valve as illustrated is a check valve which is responsive to the position of the actuator portion 46 of the push rod 40 as well as the differential pressure there across.

The brake cylinder test ports 18 and 18' and brake cylinder port 22 are on one side of the ratio valve seat 54 and the control valve port 20 is on an opposite side of the ratio valve seat 54. Thus, the cylinder test ports 18 and 18' accurately reflects the brake cylinder pressure and not the desired brake cylinder pressure from the control valve 28 at port 20.

The housing portion 16 includes a first bore 64 and a second smaller bore 66 to receive the ratio piston 48. The end wall of bore 66 acts as a stop for the ratio piston 48 in its release or loaded position. A stop ring 68 is provided in the larger bore 64 as a stop adjacent to the empty-load position. The exterior surface of the ratio piston 48 is separated from the internal bores 64 and 66 to create a space 71 therebetween which is sealed by seals 71 and 72. With the ratio piston 48 in the release or the loaded load position, the internal space 71 connects the equalizing volume port 24 with the exhaust port 26 and disconnects the equalizing port 24 from the control valve port 20. When the ratio piston 48 is moved to its empty-load position, the internal space 71 is connected only to the exhaust port 26 and the equalization volume port 24 is disconnected from the exhaust port 26 and is connected to the control valve port 20.

Figure 4:
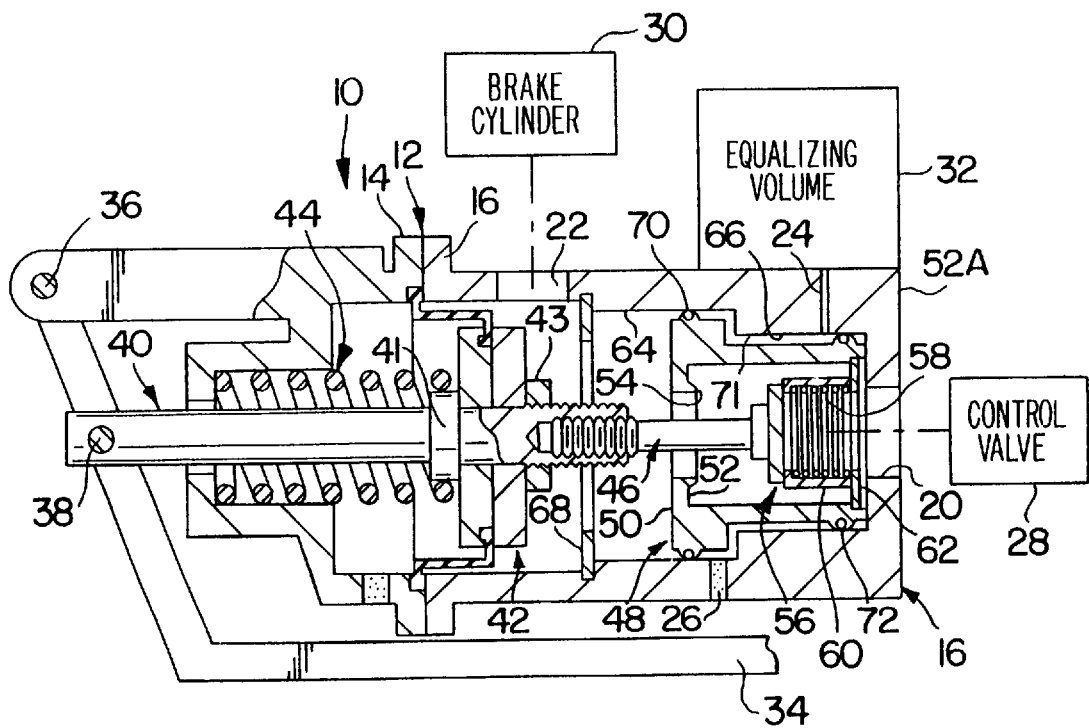
FIG. 4 is a cross-sectional view of an empty-load device incorporating the principles of the present invention in the release position.
Figure 5:
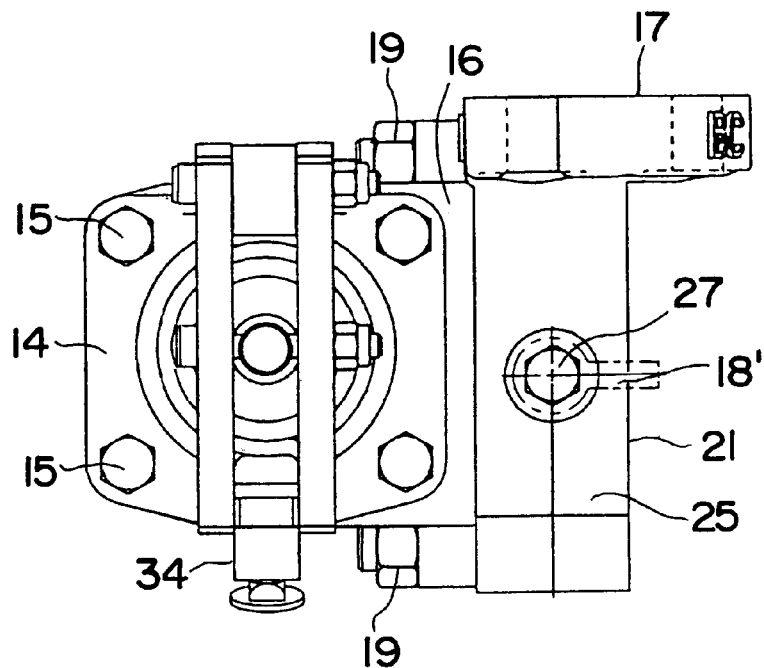
FIG. 5 is a right side view of a first embodiment of the empty-load device in FIG. 1.

It should be noted that the specifics of the changeover valve of FIG. 4 is just an example of a changeover valve which may be used. The critical point is that the brake cylinder port or outlet 22 of the empty-load device and the brake cylinder test port 18 are on the same side of the valve seat 54. This provides an accurate reading of the brake cylinder pressure versus the desired brake cylinder pressure from the control valve 28 at the inlet or control valve port 20. For the specific operation of the empty-load device illustrated in FIG. 4, reference is made to U.S. Pat. No. 5,211,450 which is incorporated herein by reference.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. An empty-load device comprising:

a pipe bracket having a first face and a second face; a brake cylinder port and a control valve port on the first face of the pipe bracket, and a brake cylinder test port on the second face of the pipe bracket, a housing connected to the pipe bracket; and a valve structure in the housing limiting fluid pressure at the brake cylinder port and brake cylinder test port from the control valve port in response to a load force on a railroad car.

2. An empty-load device according to claim 1, wherein the valve structure includes a valving element and a valve seat; and the brake cylinder port and brake cylinder test port are on one side of the valve seat and the control valve port is on an opposite side of the valve seat.

3. An empty-load device according to claim 1, including a check valve in the brake cylinder test port which is opened when a connector is mated with the brake cylinder test port.

4. An empty-load device according to claim 1, including an equalizing reservoir port on the pipe bracket.

5. An empty-load device according to claim 4, wherein the pipe bracket includes a first face and second and third face on the opposed sides of the first face; the brake cylinder and control valve ports are on the first face, the equalization reservoir port is on the second face and the brake cylinder test port is on the third face.

6. An empty-load device according to claim 5, wherein the brake cylinder port is adjacent the third face and the control valve port is adjacent the second face.

7. A rail brake system comprising:

a control valve having an outlet providing a brake signal;

an empty-load device including a) a pipe bracket having a first face and second and third face on opposed sides of the first face, a device inlet on the first face connected to the outlet of the control valve, a device outlet on the first face, and a test port on the second face, and b) a housing connected to the pipe bracket and having a valve structure limiting fluid pressure at the device outlet and test port from the device inlet in response to a load force on a railroad car; and a brake cylinder connected to the device outlet.

8. A rail brake system according to claim 7, wherein the valve structure includes a valving element and a valve seat; and the outlet inlet and test port are on one side of the valve seat and the device inlet is on an opposite side of the valve seat.

9. A rail brake system according to claim 7, including a check valve in the test port which is opened when a connector is mated with the test port.

10. A rail brake system according to claim 7, an equalizing reservoir port on the third face of the pipe bracket; and an equalizing reservoir connected to the equalizing reservoir port.

11. A rail brake system according to claim 10, wherein the pipe bracket includes a first face and second and third face on the opposed sides of the first face; the brake cylinder and control valve ports are on the first face, the equalization reservoir port is on the second face and the brake cylinder test port is on the third face.

12. An empty-load device according to claim 11, wherein the brake cylinder port is adjacent the third face and the control valve port is adjacent the second face.

13. An empty-load device comprising:

a pipe bracket including a first face and second and third face on the opposed sides of the first face, a brake cylinder port and control valve port on the first face, an equalization reservoir port on the second face, the brake cylinder being adjacent the second face and the control valve port being adjacent the third face;

a housing connected to the pipe bracket and including a brake cylinder test port; and a valve structure in the housing limiting fluid pressure at the brake cylinder port and brake cylinder test port from the control valve port in response to a load force on a railroad car.

14. An empty-load device comprising:

a housing;

a pipe bracket connected to the housing, the pipe bracket having a brake cylinder port and a control valve port on a first face, and a second and a third face on opposed sides of the first face; and a valve structure in the housing limiting fluid pressure at the brake cylinder port and a brake cylinder test port from the control valve port in response to a load force on a railroad car;

an equalization reservoir port on the pipe bracket;

wherein, the brake cylinder test port is on the second face and the equalization reservoir port is on the third face.

* * * * *